(12) United States Patent
Ou et al.

(10) Patent No.: US 12,488,953 B1
(45) Date of Patent: Dec. 2, 2025

(54) SWITCH TRIGGER ASSEMBLY FOR AN ELECTRONIC DEVICE

(71) Applicant: SHENZHEN OREN MEDICAL TECHNOLOGY CO., LTD, Shenzhen (CN)

(72) Inventors: Baihui Ou, Shenzhen (CN); Li Xiang, Shenzhen (CN); Tang Yuanzhou, Shenzhen (CN); Lin Jiaming, Shenzhen (CN); Feng Jianxin, Shenzhen (CN); Alain Dijkstra, Amstelveen (NL)

(73) Assignee: SHENZHEN OREN MEDICAL TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/940,647

(22) Filed: Nov. 7, 2024

(30) Foreign Application Priority Data

Jun. 3, 2024 (CN) .......................... 202410720471.3

(51) Int. Cl.
| | |
|---|---|
| *H01H 13/14* | (2006.01) |
| *H01H 13/02* | (2006.01) |
| *H01H 13/20* | (2006.01) |
| *H02J 7/00* | (2006.01) |

(52) U.S. Cl.
CPC .......... *H01H 13/14* (2013.01); *H01H 13/023* (2013.01); *H01H 13/20* (2013.01); *H02J 7/0042* (2013.01)

(58) Field of Classification Search
CPC ...... H01H 13/14; H01H 13/023; H01H 13/20; H01H 3/12; H01H 13/02; H02J 7/0042; H02J 7/00
See application file for complete search history.

(56) References Cited

U.S. PATENT DOCUMENTS 6,900,402 B2 * 5/2005 Lam .................... H01H 13/023
                                                          200/341

* cited by examiner

*Primary Examiner* — Lheiren Mae A Caroc
(74) *Attorney, Agent, or Firm* — Vani Moodley, Esq.

(57) ABSTRACT

The present invention relates to a switch trigger assembly (100) having a frame (30), a pressing piece (10), and a charging structure (20). The frame (30) is arranged on or in the electronic device (1). Specifically, the frame (30) is arranged on a housing (200) of the electronic device (1), and the pressing member (10) is attached to the frame (30) to trigger a switch element (300) arranged on the electronic device (1). Further, the charging structure (20) is integrated into the pressing member (10). The charging structure (20) has a first end exposed from a first surface (11) of the pressing member (10) to receive electrical charge from an external charging device, and a second end in connection with a circuit board (400) of the electronic device (1) for connecting the external charging device with the circuit board (400), integrating switching and charging functionality into single assembly.

19 Claims, 9 Drawing Sheets

SWITCH TRIGGER ASSEMBLY FOR AN ELECTRONIC DEVICE

TECHNICAL FIELD

The present invention relates to a switching assembly. More specifically, the present invention relates to a switch trigger assembly for an electronic device.

BACKGROUND

With the improvement of people's quality of life and the transformation of aesthetic concepts, more and more consumers, particularly women, are placing greater emphasis on beauty and skincare. As part of their beauty and skincare routines, users often utilize devices that combine liquid medicine with an electric mechanism to enhance the absorption of nutrients into the skin. This combination not only improves skin texture and tightens the skin but also reduces pigmentation and lightens spots, contributing to a more youthful and radiant appearance.

In the realm of electric skincare devices, current designs typically feature separately arranged pressing parts and charging structure on the device housing. This separation necessitates the creation of multiple holes in the housing for assembling these components. The presence of numerous holes can compromise the sealing integrity of the device, potentially allowing moisture and contaminants to enter and negatively impact the device's functionality and longevity.

Moreover, the pressing part and charging structure occupy a considerable area on the outer surface of the device housing. This allocation of space often results in a cluttered and less aesthetically pleasing appearance, detracting from the sleek and modern design that consumers desire. A disorganized outer surface can also make the device less ergonomic, impacting the user's comfort and ease of use.

In existing therapeutic liquid outlet heads, the charging structure are arranged in the outlet section. Therefore, during charging, it is necessary to open the outer cover to expose the outlet section, making it vulnerable to contamination or damage during the charging process. In an alternative existing solution, a charging circuit transfer structure needs to be set on the outer cover so that when the outer cover covers the outlet section, the charging circuit transfer structure electrically connects with the charging structure, allowing charging with the outer cover in place. However, this makes the structure of the outer cover complex and increases production costs.

Additionally, the multiple openings and scattered components can complicate the manufacturing process, potentially increasing production costs and time. This complexity might lead to higher prices for consumers and a longer time-to-market for new products.

Therefore, there is a need for a switch trigger assembly for an electronic device to overcome a few or all drawbacks of the existing technologies.

STATEMENT OF THE INVENTION

An object of the present invention is to provide a switch trigger assembly for an electronic device.

Another object of the present invention is to provide a switch trigger assembly for an electronic device that ensures efficient and reliable operation by integrating switching and charging functionality.

Yet another object of the present invention is to provide a switch trigger assembly for an electronic device which allows precise control of the switch, ensuring accurate and responsive actuation of electronic device.

Another object of the present invention is to provide a switch trigger assembly for an electronic device that improves user convenience by simplifying the operation and interaction with electronic devices.

One more object of the present invention is to provide a switch trigger assembly for an electronic device, which facilitates external charging of electronic devices in a seamless and efficient manner.

According to the present invention, there is provided a switch trigger assembly for an electronic device. The electronic device may be having a housing, a circuit board, and a switch element arranged on the circuit board for actuating an actuating mechanism. The actuating mechanism may include a light emitting element or a heating element or a vibrating member or a cooling element to respond to the trigger received from the pressing member.

Further, the switch trigger assembly may include a frame, a pressing member, and charging structure.

The frame may be arranged on or in the electronic device. Preferably, the frame has a locking part extending along an edge of the frame to connect the frame with the housing of the electronic device. The housing may have an aperture to receive the switching assembly therefrom. The housing has a mounting strip arranged around the aperture of the housing to receive and hold the frame therein.

The frame may have an opening adapted to receive the pressing member therein. The pressing member may be attached to the frame to trigger the switch element arranged on the electronic device. The pressing member is movable between a first position and a second position. In the second position, the pressing member triggers the switch element of the electronic device when pressed by the user.

Preferably, the pressing member may have a protruding column extending downward from the second surface of the pressing member. Upon pressing the pressing member, the protruding column pushes the switch element to actuate the actuating mechanism of the electronic device.

Further, the pressing member may have a limiting groove configured on a side surface of the pressing member to engage with the frame, and the frame may have a limiting part protruding inwards from an edge of the opening to engage with the limiting groove of the pressing member. The limiting groove may be adapted to limit the movement of the pressing member between the first position and the second position.

The charging structure may be integrated into the pressing member. The charging structure may have a first end exposed from a first surface of the pressing member to receive an electrical charge from an external charging device arranged externally to charge the electronic device. Further, the charging structure may have a second end may be in connection with the circuit board for establishing an electrical connection between the external charging device and the circuit board.

Specifically, the charging structure may have a first pin and a second pin arranged adjacent to each other. The First end of the first pin and the second pin may be aligned with a mounting hole provided on the pressing member to connect with the external charging device. The second end may be adapted to connect with the circuit board of the electronic device.

In another aspect of the present invention, the pressing member may be provided with a recessed portion penetrated from the second surface. The recessed portion may be provided to receive and attach a magnetic element therein.

The magnetic element facilitates a magnetic attachment with the external charging device ensuring the continuous electrical contact between the external charging device and the charging structure.

Furthermore, in an aspect, the switch trigger assembly may include a retraction part attached to the frame. The retraction part may be adapted to deform when the pressing member is pressed, and to retract upon removal of the applied force, returning the pressing member to the first position.

Further, the retraction part may include a sealing plate and a protruding portion. The protrusion may be located on the edge of the sealing plate. The frame may be provided with a slot and is adapted to receive the protrusion therein for securely attaching the retraction part with the frame.

Further, the retraction part may be adapted to receive the protruding column and the charging structure. Specifically, the retraction part has a first through hole to receive the protruding column and a second through hole to receive the charging structure.

In another aspect, the frame may be provided with two elastic arms, respectively located on opposite sides of the opening to support the pressing member on opposite sides. The two elastic arms are adapted to support the pressing member for bearing a portion of a pressing force thereon.

In another aspect, the switch trigger assembly may include a magnetic element attached to the pressing member for obtaining the first half assembly or the second half assembly.

In another aspect, an electronic device having a switch trigger assembly is provided. The electronic device may be having a housing, a circuit board, a switch element, and an actuating mechanism electrically connected to the circuit board. The switch trigger assembly may be arranged in the housing and electrically connected to the circuit board. The housing may be adapted to house the circuit board. The circuit board may be exposed through an aperture arranged on the housing. The aperture may be adapted to receive the switch trigger assembly therefrom.

The switch trigger assembly may include a frame, a pressing member, and charging structure. The frame may be arranged in the housing. The pressing member may be attached to the frame to trigger the switch arranged on the circuit board thereby actuating the actuating mechanism. The pressing member may be having a first surface and a second surface.

Further, the charging structure may be integrated into the pressing member. First end of the charging structure may be exposed from the first surface of the pressing member to receive an electrical charge from the external charging device arranged externally to charge the electric device, and the second end is in connection with the circuit board for establishing an electrical connection between the external charging device and the circuit board.

In an aspect, the electronic device may include an applicator, which is arranged at an end of the outlet section away from the assembly section. The applicator may be used to apply the liquid output on the skin of the user.

In the present aspect, the applicator is a roller ball, which is rollingly arranged at an end of the outlet section away from the assembly section. The roller ball may be adapted to apply the liquid to the skin while rolling over the skin.

Further, a method to assemble a switch trigger assembly to an electronic device is provided.

At first, the switch trigger assembly may be obtained by assembling the pressing member, the charging structure, the frame and the retraction part. The switch trigger assembly may be obtained by the following steps.

First, the charging structure may be attached to the pressing member to obtain a first half assembly.

The retraction part may be attached to the frame to obtain a second half assembly.

Further, the first half assembly may be assembled with the second half assembly to obtain the switch trigger assembly.

Furthermore, the switch trigger assembly may be attached to a housing of the electronic device facilitating the switching and charging of the electronic devices thereafter.

BRIEF DESCRIPTION OF DRAWINGS

Other features and advantages of the invention will become apparent when reading the detailed description given below, purely by way of example and in a non-limitative manner, referring to the following figures.

DETAILED DESCRIPTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The present invention provides a switch trigger assembly for an electronic device. The switch trigger assembly focuses on enhancing the functionality and usability of electronic devices by integrating a seamless mechanism that simplifies operation and charging. The switch trigger assembly provides an efficient and reliable solution that improves user convenience, strengthens structural integrity, and ensures precise control. Further, the assembly process of the switch trigger assembly is streamlined and is easy to assemble and provides a seal to avoid damage to the electronic device from the moisture. Furthermore, the switch trigger assembly enhances safety and ensures continuous electrical contact, to charge the electronic device without any hassle.

The terms "first," "second," and the like, herein do not denote any order, quantity, or importance, but rather are used to distinguish one element from another, and the terms "a"

and "an" herein do not denote a limitation of quantity, but rather denote the presence of at least one of the referenced item.

The disclosed embodiments are merely exemplary of the invention, which may be embodied in various forms.

Figure 1:
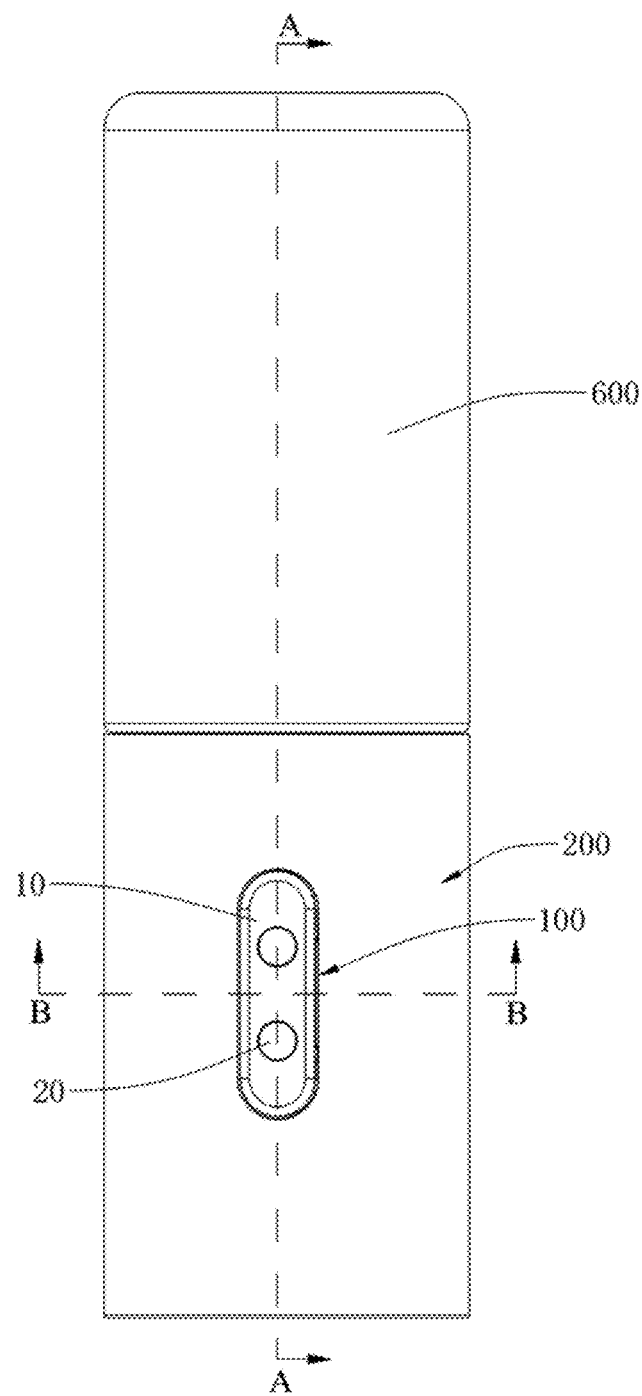
FIG. 1 shows a front view of a switch trigger assembly for an electronic device in accordance with the present invention.

Referring to FIG. 1 a switch trigger assembly (100) for an electronic device (1) in accordance with the present invention is illustrated. The electronic device (1) can be a container bottle, the cap of the container bottle, the liquid outlet head of the container bottle, a skincare scoop, a phototherapy device, an introduction device, or a standalone beauty device. For example, refer to FIG. 6, where the electronic device (1) is a skincare scoop with therapeutic functions.

Figure 5:
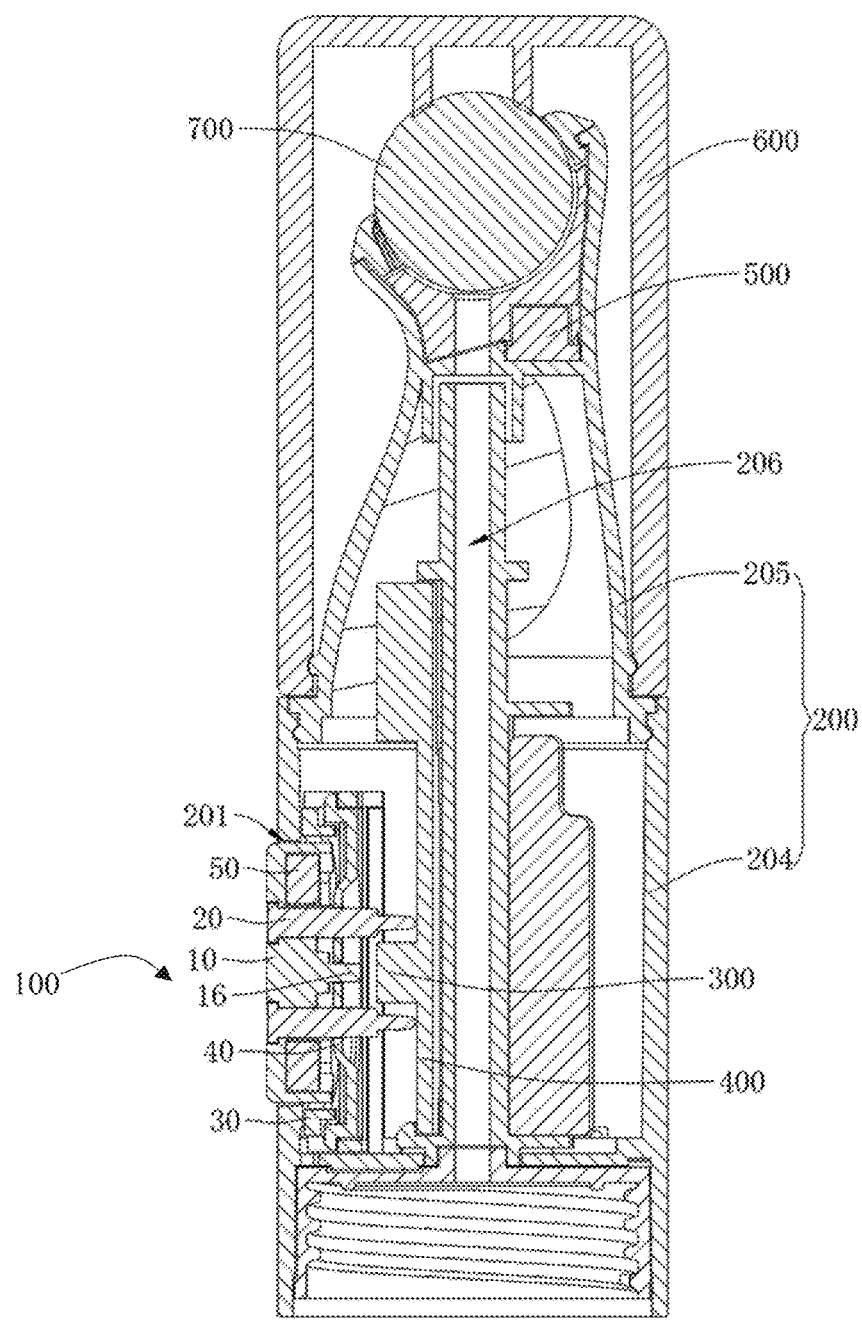
FIG. 5 shows a sectional view of one of the embodiments of the switch trigger assembly.

Referring now to FIGS. 1 and 5, the electronic device (1) is having a circuit board (400) and a switch element (300) arranged thereon to actuate an actuating mechanism (500).

The circuit board (400) is used to drive the actuating mechanism (500), which is used for beauty therapy. By operating the switch trigger assembly (100), the switch element (300) is triggered, turning the actuating mechanism (500) ON or OFF. The actuating mechanism (500) is installed on the housing (200) and is electrically connected to the circuit board (400). The actuating mechanism (500) can include one or more of a phototherapy lamp, a heating element, a vibrating element, and a cooling element. The phototherapy lamp emits light to irradiate the user's skin, promoting blood circulation, enhancing cell metabolism, accelerating skin absorption of skincare products, and having acne treatment and beauty effects. The heating element generates heat when powered, transferring heat to the skin, promoting pore opening, and facilitating skin absorption of skincare products. The vibrating element generates vibrations when powered, acting on the user's skin, helping to soothe skin tension, promote skin detoxification, and reduce puffiness and fine lines. The cooling element generates cooling when powered, acting on the user's skin to lower temperature, soothe the skin, reduce swelling, or relieve pain.

Figure 2:
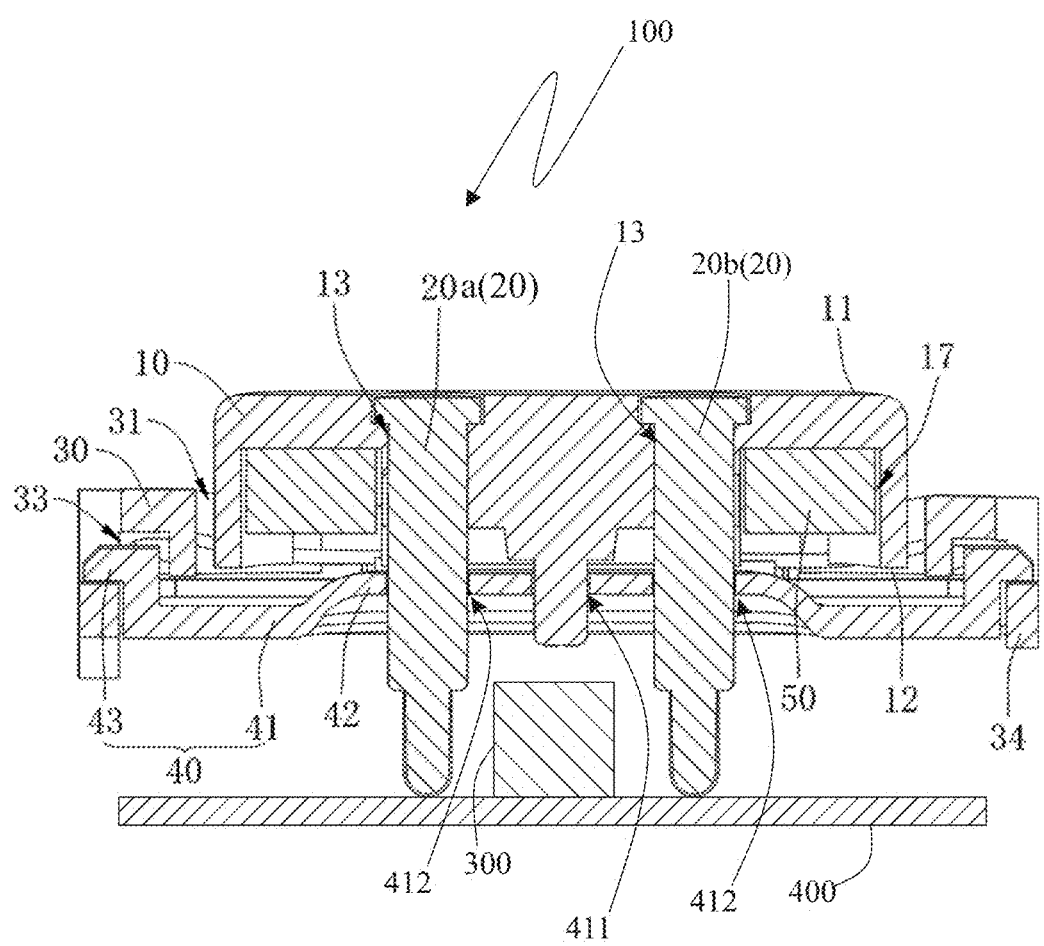
FIG. 2 shows a sectional view of the switch trigger assembly in accordance with the present invention.
Figure 3:
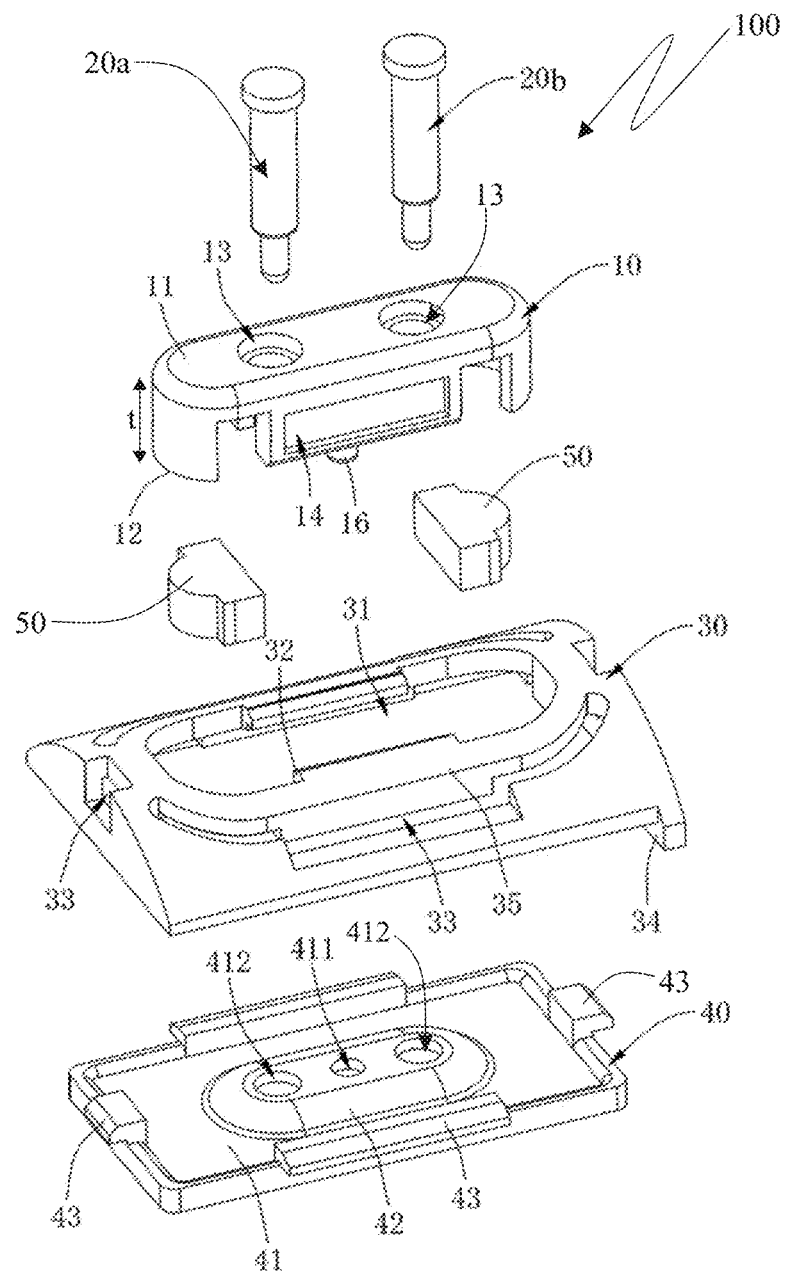
FIG. 3 shows an exploded view of the switch trigger assembly for an electronic device shown in FIG. 2.

Referring now to FIGS. 2, 3 and 5, the switch trigger assembly (100) includes a frame (30), a pressing member (10), and charging structure (20).

The frame (30) is arranged on a housing (200) of the electronic device (1). Preferably, the housing (200) is provided with an aperture (201) on its peripheral sidewall to receive and attach the frame (30).

Figure 6:
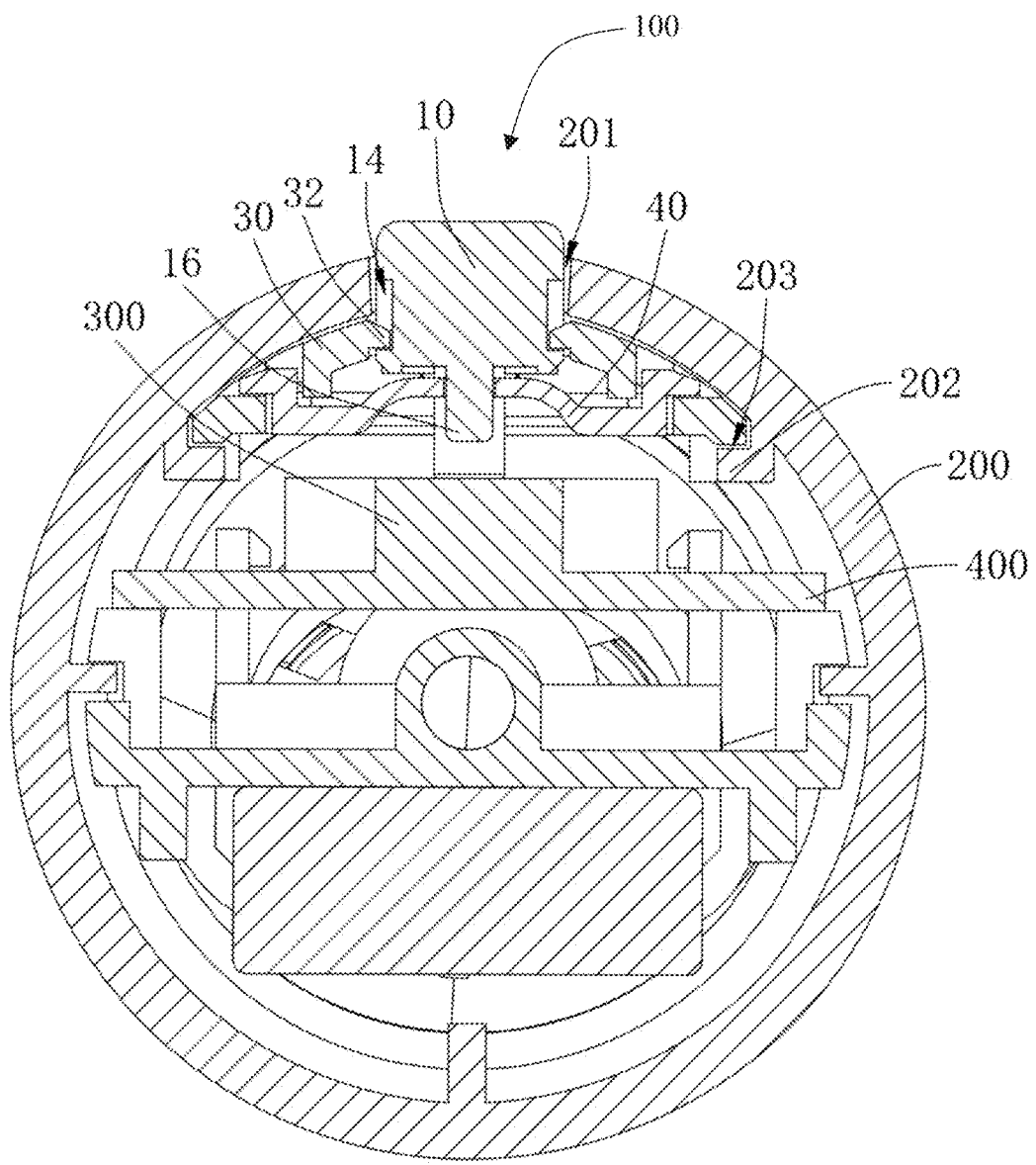
FIG. 6 shows a top-sectional view of the switch trigger assembly attached to an electronic device showing the attachment between a frame and the electronic device.
Figure 7:
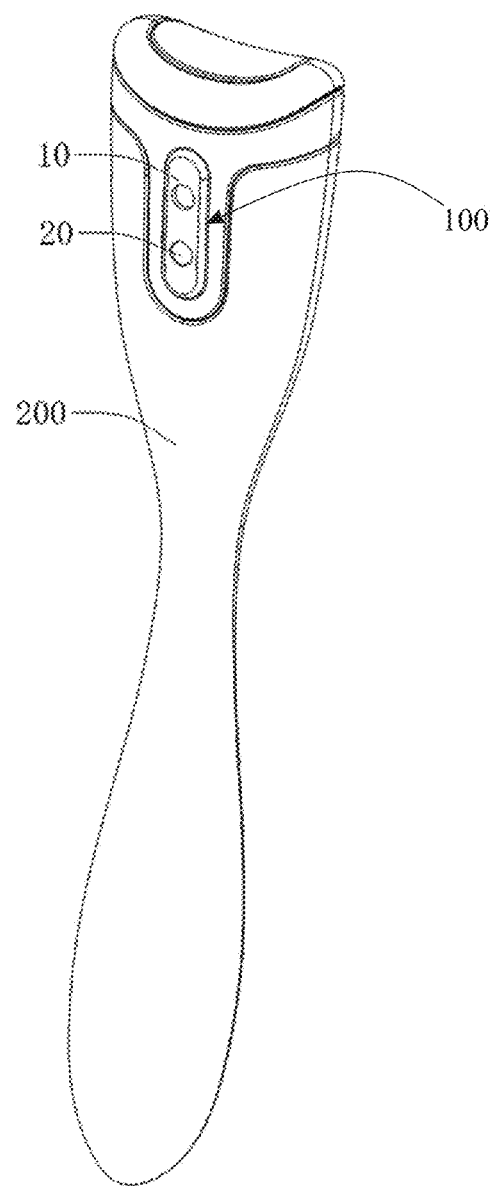
FIG. 7 shows a perspective view of another electronic device equipped with the switch trigger assembly.

Referring now to FIG. 6, the housing (200) has two mounting strips (202) for attaching the frame (30) to the housing (200). The two mounting strips (202) extend along the length direction of the housing (200), and the two mounting strips (202) are respectively positioned at the opposite two sides of the aperture (201). The two mounting strips (202) form two mounting grooves (203) respectively through the inner periphery wall surface of the housing (200), and the opposite two side edges of the frame (30) are respectively clamped in two mounting grooves (203), so that the frame (30) is assembled in the housing (200).

Referring again to FIG. 3, the frame (30) is provided with a locking part (34). The locking part (34) is located at an end of the frame (30) along the length direction of the housing (200). Preferably, the frame (30) is slid into the mounting groove (203) along the length direction of the housing (200) until the locking part (34) abuts against an end of the mounting strip (202). The frame (30) is arranged inside the housing (200) and corresponds to the circuit board (400). The circuit board (400) is arranged within the housing (200) and is having the switch element (300) arranged thereon.

The switch element (300) is a press-type mechanical switch, allowing control of the switch element (300) by pressing the pressing member (10). In an alternate embodiment, the switch element (300) can be a mechanical switch or a touch switch.

Further, the frame (30) has an opening (31) adapted to receive the pressing member (10). The pressing member (10) is attached to the frame (30) and protrudes from the aperture (201) to trigger the switch element (300) thereon.

The pressing member (10) is movable within the opening (31) of the frame (30) between a first position (as shown in FIG. 2) and a second position and is adapted to trigger the switch element (300) of the electronic device (1) in the second position.

The pressing member (10) has a first surface (11) for the user to press and a second surface (12) opposite to the first surface (11). When the switch trigger assembly (100) is arranged on the housing (200) of the electronic device (1), the first surface (11) faces the outside of the housing (200) for the user to press, and the second surface (12) faces the inside of the housing (200). The pressing member (10) is arranged over the switch element (300) on the electronic device (1) in such a way that the switch element (300) is triggered upon pressing the pressing member (10).

Further, the charging structure (20) are arranged in the pressing member (10). Specifically, the pressing member (10) is provided with a mounting hole (13) passing through the first surface (11) and the second surface (12) to receive the charging structure (20) therein. Specifically, the charging structure (20) are integrated into the pressing member (10) in such a way that a first end of the charging structure (20) is exposed on the first surface (11) and a second end is exposed on the second surface (12).

The charging structure (20) include two conductive elements with one being the positive electrode and the other being the negative electrode. The pressing member (10) has a plurality of mounting holes (13) to receive the corresponding conductive elements of the charging structure (20).

Specifically, the charging structure (20) has a first pin (20a) and a second pin (20b) arranged adjacent to each other, wherein the first end of the first pin (20a) and the second pin (20b) are aligned with the mounting hole (13) provided on the pressing member (10) to connect with the external charging device and the second end is adapted to connect with the circuit board (400) of the electronic device (1)

Further, the first end of the charging structure (20) is exposed on the first surface (11) to allow an external charging device to electrically connect with the charging structure (20) to receive an electrical charge from the external charging device, while the second end is exposed on the second surface (12) to allow the charging structure (20) to electrically connect with the circuit board (400) of the electronic device (1) for establishing an electrical connection between the external charging device and the circuit board (400) for charging the electronic device (1). The electronic device (1) has a battery (not shown) arranged within the housing (200) to power the actuating mechanism (500) and is adapted to receive the electrical charge to recharge upon connecting to the external charging device.

In the present embodiment, the switch trigger assembly (100) integrates the charging structure (20) with the pressing member (10) by arranging the charging structure (20) through the mounting hole (13), forming an integral unit. This eliminates the need to reserve separate holes for installing the pressing member (10) and the charging structure (20) on the housing (200), reducing the number of holes in the housing (200), improving its sealing, and effectively reducing the area occupied on the outer surface of the housing (200), resulting in a neater and more aesthetically pleasing appearance.

In an embodiment, the charging structure (20) are sealed in the mounting hole (13), for example, by filling sealing glue or sealing strips between the charging structure (20) and the mounting hole (13), or by integrally forming the outer shell of the charging structure (20) and the pressing member (10) through injection molding.

Referring now to FIGS. 2 and 3, the pressing member (10) is provided with a limiting groove (14) configured on a side surface of the pressing member (10) to engage with the frame (30), and the frame (30) is provided with a limiting part (32) protruding inwardly from an edge of the opening (31) to engage with the limiting groove (14) of the pressing member (10). The limiting part (32) is movable between the opposite side walls of the limiting groove (14) along the thickness (t) direction of the pressing member (10).

When a pressing force (F) is applied to the pressing member (10), the pressing member (10) moves toward the switch element (300) for configuring the second position. The limiting part (32) moves along the thickness direction (t) of the pressing member (10) within the limiting groove (14). When the pressing member (10) triggers the switch element (300), the limiting part (32) abuts the side wall of the limiting groove (14) near the first surface (11), achieving the limitation of the pressing member (10) and preventing it from damaging the switch element (300).

When the pressing force (F) on the pressing member (10) is removed, the pressing member (10) retracts to the first position, with the limiting part (32) moving within the limiting groove (14) until the limiting part (32) abuts the side wall of the limiting groove (14) near the second surface (12), achieving the limitation of the pressing member (10) and preventing it from disengaging from the frame (30).

During the movement of the pressing member (10), the limiting part (32) and the limiting groove (14) cooperate to limit the movement range of the pressing member (10), preventing the pressing member (10) from damaging the switch element (300) or disengaging from the frame (30) and shaking relative to the frame (30).

Specifically, the pressing member (10) has two limiting grooves (14), respectively arranged on opposite sides of the pressing member (10), and two limiting parts (32), respectively located on opposite sides of the opening (31), with the limiting parts (32) engaging with the limiting grooves (14), enhancing the stability of the pressing member (10) and effectively preventing it from shaking or tilting during movement.

Further, the pressing member (10) is provided with a magnetic element (50) which is arranged on the second surface (12) of the pressing member (10). The magnetic element (50) can be located on the side of the second surface (12) or embedded in the pressing member (10).

By arranging the magnetic element (50) on the pressing member (10), the magnetic element (50) is used to magnetically attach to the external charging device, ensuring stable electrical contact between the external charging device and the charging structure (20), achieving stable charging.

The magnetic element (50) is a magnet or a metal object capable of being magnetically attracted to the magnet on the external charging device, such as iron, nickel, or cobalt.

In the present embodiment, the magnetic element (50) is a magnet, and there are two magnetic elements (50), spaced apart, with opposite magnetic properties. During charging, the two magnets on the external charging device, with opposite magnetic properties, are respectively magnetically attached to the two magnetic elements (50), ensuring that the positive contact on the external charging device accurately connects to the positive electrode of the charging structure (20) and the negative contact on the external charging device accurately connects to the negative charging structure (20).

Specifically, the pressing member (10) is provided with a recessed portion (17), penetrating the second surface (12), to arrange the magnetic element (50) therein. By providing the recessed portion (17), the magnetic element (50) is stably arranged on the pressing member (10).

Specifically, when there are two magnetic elements (50), the pressing member (10) is provided with the two recessed portions (17), and the two magnetic elements (50) are arranged in the corresponding two recessed portions (17), ensuring the stability of the installation of each magnetic element (50).

Furthermore, the switch trigger assembly (100) includes a retraction part (40) attached to the frame (30). The retraction part (40) is arranged opposite to the pressing member (10). The pressing member (10) pushes the retraction part (40) to produce elastic deformation. When the pressing force (F) on the pressing member (10) is removed, the pressing member (10) moves away from the switch element (300) under the action of the retraction part (40) and configures the first position.

It is obvious for a person skilled in the art to make the retraction part (40) from silicone or other materials. In other embodiments, the retraction part (40) may also be a spring or a resilient component.

The retraction part (40) includes a sealing plate (41) and a protrusion (43). The protrusion (43) is located on the edge of the sealing plate (41). Specifically, the frame (30) is provided with a slot (33) and is adapted to receive the protrusion (43) therein.

Preferably, the multiple slots (33) are provided around the periphery of the frame (30), and multiple protrusions (43) are provided on the retraction part (40), with the protrusions (43) fitting into the corresponding slots (33), enhancing the stability of the connection between the retraction part (40) and the frame (30). Specifically, the slot (33) is provided in four positions around the periphery of the frame (30), and the protrusion (43) is provided in four positions around the edge of the sealing plate (41). By fitting the four protrusions (43) into the four slots (33), the edge of the sealing plate (41) is connected to the frame (30), ensuring the stable connection between the retraction part (40) and the frame (30), allowing the sealing plate (41) to elastically deform stably and enhancing the stability of the pressing member (10).

The sealing plate (41) is used to seal the opening (31) of the frame (30). Moreover, the sealing plate (41) is located on the inner side of the opening (31), and the edge of the sealing plate (41) is connected to the frame (30), thereby sealing the opening (31). The sealing plate (41) abuts the pressing member (10) and allows the pressing member (10) to push the sealing plate (41) when pressure is applied. When the pressing force (F) on the pressing member (10) is removed, the sealing plate (41) elastically recovers and pushes the pressing member (10) to the first position.

The edge of the sealing plate (41) is integrally connected to the frame (30). In another embodiment, the edge of the sealing plate (41) is fixed to the periphery of the corresponding opening (31) of the frame (30) by injection moulding, gluing, or welding.

The sealing plate (41) is integrally connected to the edge of the frame (30), thereby sealing the opening (31) which prevents external moisture or dust from entering the housing (200) through the opening (31) and damaging the electronic components inside the housing (200), such as the circuit board (400). The retraction part (40) not only provides the automatic reset of the pressing member (10) to the first position but also seals the opening (31), increasing the functionality of the retraction part (40) and eliminating the need for other components to seal the opening (31).

Further, the sealing plate (41) has a protruding portion (42) facing the pressing member (10), which corresponds to the pressing member (10) and elastically deforms when the pressing member (10) moves from the first position to the second position, resulting in a compact and well-fitting structure.

Furthermore, to support the retraction of the pressing member (10), the frame (30) is provided with two elastic arms (35), respectively located on opposite sides of the opening (31), to support the pressing member (10) on opposite sides. Preferably, the elastic arms (35) are provided with the slot (33).

The elastic arms (35) are provided to bear apart of the pressing force (F) received by the retraction part. Specifically, the elastic arms (35) support the pressing member (10) on opposite sides when the pressing member (10) triggers the switch element (300), thereby preventing the retraction part (40) from being overly compressed or causing a gap between the edge of the sealing plate (41) and the frame (30), which would compromise the sealing of the sealing plate (41) on the opening (31).

In an embodiment, the pressing member (10) is provided with a protruding column (16) (shown in FIG. 3) for pushing the switch element (300). The protruding column (16) extends downward from the second surface (12) of the pressing member (10). By pressing the pressing member (10), the protruding column (16) approaches and triggers the switch element (300) thereby actuating the actuating mechanism (500).

Specifically, the sealing plate (41) is provided with a first through hole (411), and the protruding column (16) is arranged through the first through hole (411).

Further, the sealing plate (41) is provided with a second through hole (412), and the charging structure (20) are arranged through the second through hole (412). The charging structure (20) protrude from the second surface (12) and extend through the second through hole (412), enabling the charging structure (20) to electrically connect with the circuit board (400). Specifically, the number of the second through holes (412) is also two, and the two second through holes (412) are parallel to the two mounting holes (13). The two conductive elements of the charging structure (20) are installed through the two mounting holes (13) and the corresponding second through holes (412).

Additionally, the switch element (300) is an elastic structure capable of elastic deformation, and the charging structure (20) are also capable of elastic deformation. Thus, when the pressing member (10) pushes the switch element (300), the switch element (300) and the charging structure (20) elastically deform. When the pressing member (10) resets to the first position, the switch element (300) and the charging structure (20) elastically recover, maintaining stable electrical contact between the charging structure (20) and the circuit board (400) without additional soldering, simplifying the assembly process and reducing costs.

The sealing plate (41) and the charging structure (20), both are elastic, allowing the pressing member (10) to quickly and stably reset to the first position under the combined elastic force of the sealing plate (41) and the charging structure (20) when the pressing force (F) is removed.

Figure 4A:
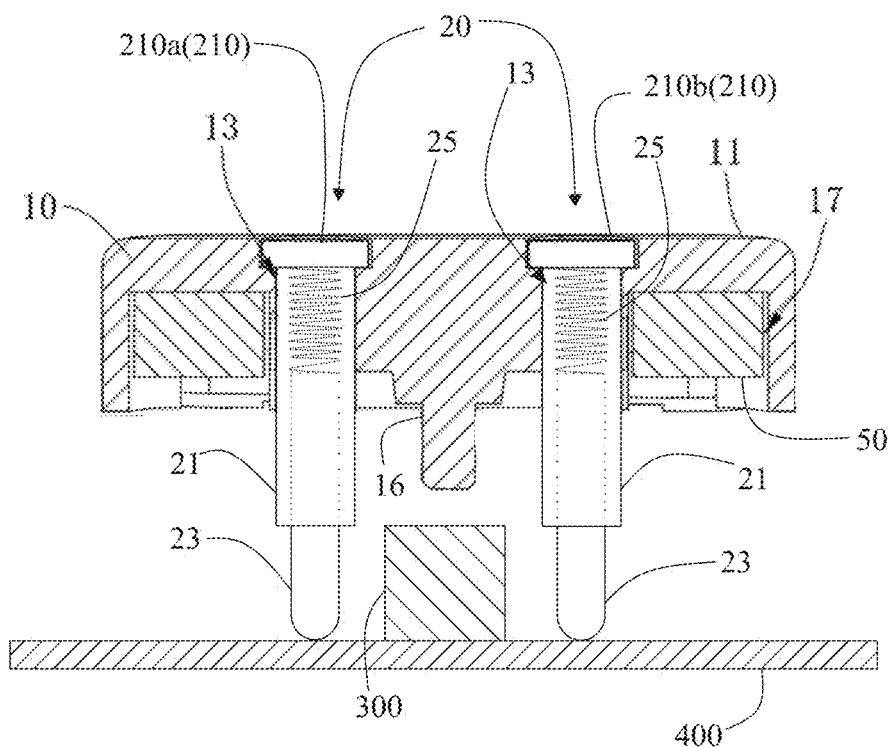
FIG. 4*a*-4*b* shows a side view of a pressing member of the switch trigger assembly in a first position and a second position.
Figure 4B:
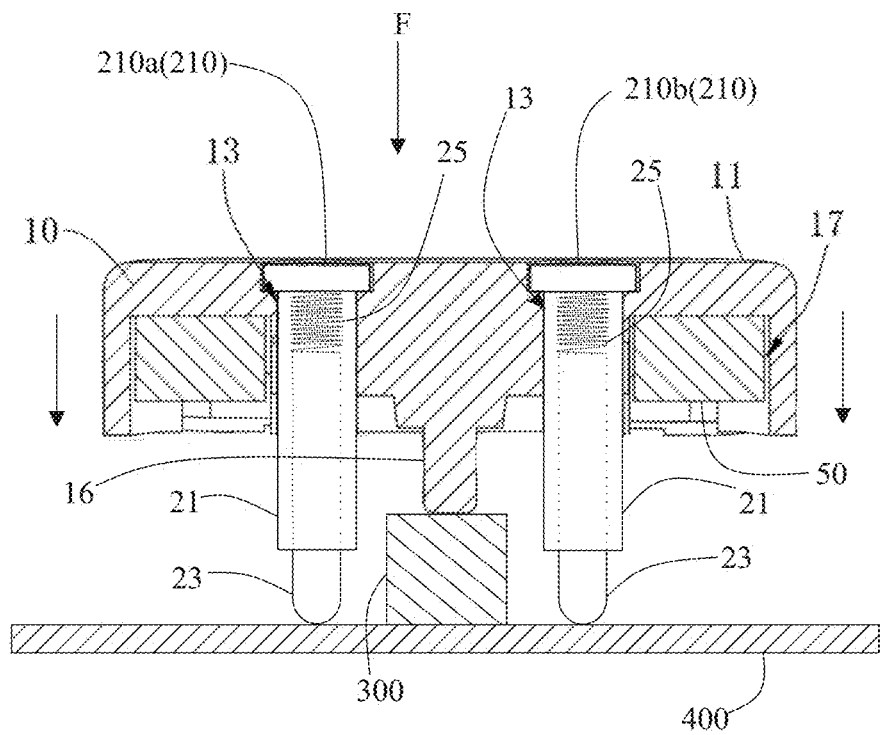

In one embodiment shown in FIG. 4a-4b, the charging structure (20) includes at least one spring pin (210), which can be used to contact the circuit board (400) to achieve electrical connectivity and provide an elastic force to facilitate the resetting of the pressing member (10) for improving the pressing feel. In this embodiment, two spring pins (210a, 210b) are located on opposite sides of the protruding column (16) to enhance the stability of the pressing member (10) during pressing, ensuring stable electrical connectivity.

Specifically, the spring pin (210) consists of two parts (as shown in FIGS. 4a and 4b), a first part (21) arranged through the mounting hole (13) of the pressing member (10) and a second part (23) arranged in or on the first part (21). The second part (23) is telescopically arranged on or in the first part (21) and is biased using a biasing member (25). Preferably, the second part (23) is telescopically movable within the first part (21) during the movement of the pressing member (10) between the first position and the second position. Upon applying a pressing force (F) on the pressing member (10), the spring pin (210) allows the pressing member (10) to configure the second position by overcoming a spring force of the biasing member (25). Upon removal of the pressing force (F) from the pressing member (10), the pressing member (10) resets back to the first position due to the biasing force of the biasing member (25). The integration of the spring pin (210) as charging structure (20) from the first surface (11) to the second surface (12) allows the pressing member (10) to efficiently configure the first position.

In another embodiment of the present invention, as shown in FIG. 5, the electronic device (1) is a container bottle, which also includes a bottle body. The first end of the housing (200) is connected to the bottle body with a bottle mouth. The housing (200) has a liquid outlet channel (206) formed therein and connected to the opening of the bottle body. The bottle body is used to contain cosmetics, such as creams and lotions. The cream can be a face cream, an eye cream, a body cream, etc., and the lotions can be essences, emulsions, essential oils, etc. The actuating mechanism (500) is installed at one of the ends of the housing (200), and the other end of the housing (200) is connected to the bottle body with a bottle mouth, for sealing of the bottle mouth to protect the skincare products inside the bottle body. Thus, the electronic device (1) has both beauty therapy functions and the function of containing skincare products.

The electronic device (1) has a housing (200) to house the circuit board (400). The circuit board (400) is exposed through an aperture (201) arranged on the housing (200), wherein the aperture (201) is adapted to receive the switch trigger assembly (100) therefrom. Furthermore, the housing (200) includes an assembly section (204) and an outlet section (205). The assembly section (204) is connected to the bottle body with a bottle mouth. Specifically, the assembly section (204) is provided to accommodate the switch trigger assembly (100). The actuating mechanism (500) is installed at an end of the outlet section (205) away from the assembly section (204). The liquid inside the bottle body is travelled through the liquid outlet channel (206) at the end of the outlet section (205) away from the assembly section (204). Additionally, the electronic device (1) includes an outer cover (600). The outer cover (600) is provided to cover the outlet section (205) to protect it from contamination and damage.

In this embodiment, the switch trigger assembly (100) is arranged in the assembly section (204), so charging can be performed with the outer cover (600) covering the outlet section (205), without needing a charging circuit transfer structure on the outer cover (600). This simplifies the structure of the outer cover (600) and reduces production costs.

Further, the electronic device (1) includes an applicator (700), which is set at the end of the outlet section (205) away from the assembly section (204). The applicator (700) is used to apply the liquid output from the end of the outlet section (205) away from the assembly section (204) onto the skin and to massage the skin. By using the applicator (700), the liquid can be evenly applied to the skin while massaging it, achieving a beauty massage effect.

Preferably, the applicator (700) is a roller ball, which is rollingly arranged at the end of the outlet section (205) away from the assembly section (204). The roller ball (700) applies the liquid to the skin while rolling over it, providing a rolling massage with low resistance and convenient use for the user.

Figure 8:
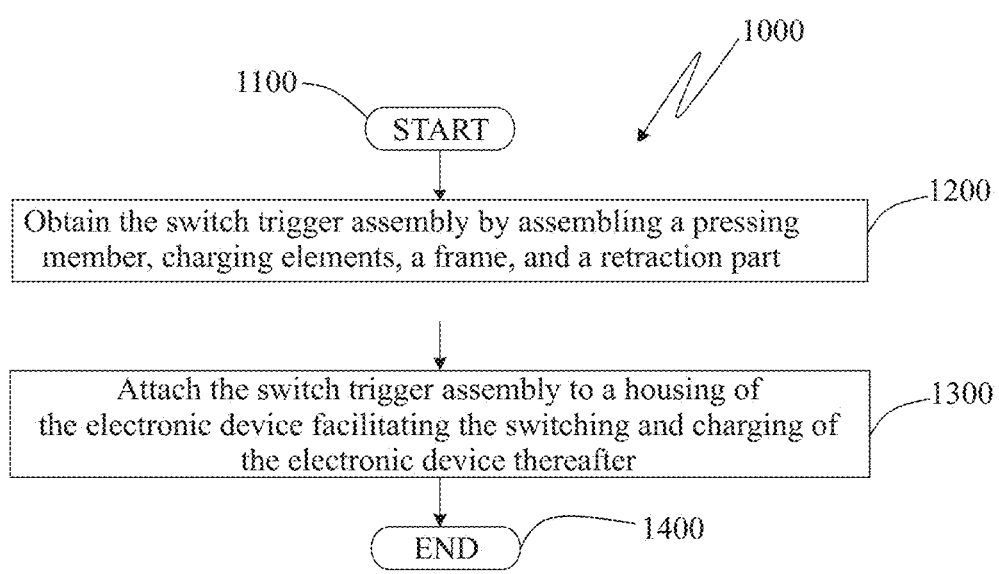
FIG. 8 shows a flowchart of a method to assemble the switch trigger assembly on the electronic device.

Referring now to FIG. 8, a method (1000) to assemble the switch trigger assembly (100) connecting to an electronic device (1) is provided. The method (1000) is described in conjunction with the switch trigger assembly (100) shown in FIGS. 2 and 3. The method (1000) comprises the steps of:

The method (1000) starts at step (1100).

Figure 9:
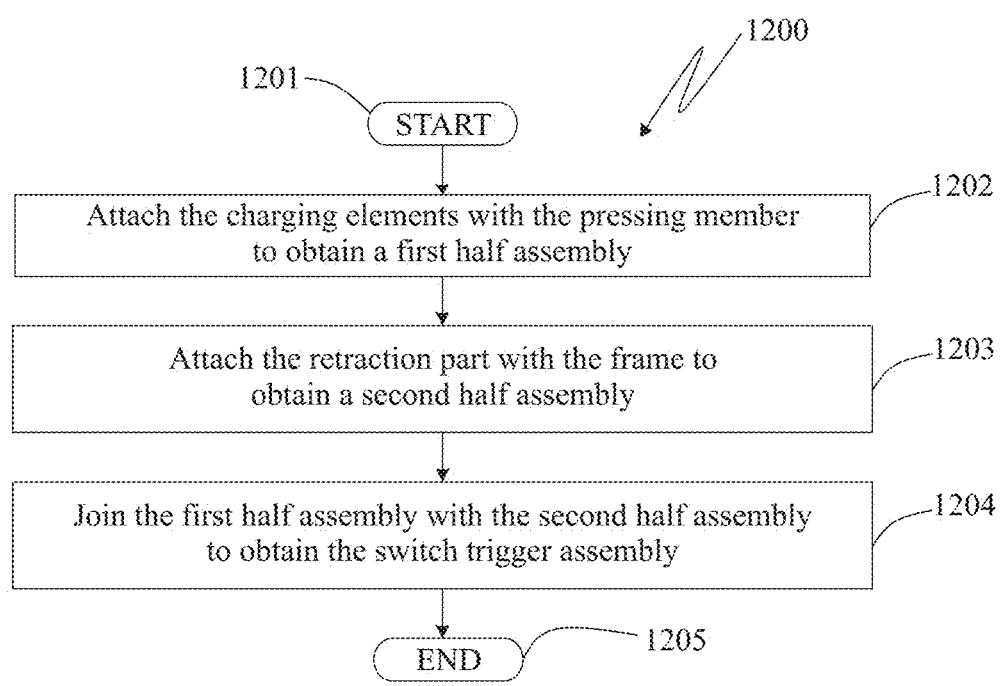
FIG. 9 shows a flowchart of a method to obtain the switch trigger assembly.

Step 1200: the pressing member (10), the charging structure (20), the mounting seat (30), and the retraction member (40) are assembled to obtain the switch trigger assembly (100). Further, a method (1200) of obtaining the switch trigger assembly (100) is provided. The method (1200) (as shown in FIG. 9) includes the following steps:

The method (1200) starts at step (1201).

At first Step (1202), the charging structure (20) are attached with the pressing member (10) to obtain a first half-assembly. For example, insert the charging structure (20) through the mounting hole (13) and perform a sealing treatment between the charging structure (20) and the mounting hole (13), such as filling with sealant or sealing strips.

Then at step (1203), the retraction member (40) is attached with the frame (30) to obtain a second half-assembly. For example, snap the protrusion (43) of the retraction member into the slot (33) of the frame (30), and align the first through hole (411) and the second through hole (412) of the retraction member (40) with the opening (31) of the frame (30).

In an embodiment, the magnetic element (50) is attached to the pressing member (10) between Step (1202) and Step (1203), or before Step 1202. For example, snap the magnetic element (50) into the recessed portion (17).

Further, in step (1204), the first half-assembly and the second half-assembly are joined together to obtain the switch trigger assembly (100). For example, insert the pressing member (10) through the opening (31) and attach the limiting part (32) into the limiting groove (14). The protruding column (16) passes through the first through hole (411), and the charging structure (20) pass through the second through hole (412).

The method (1200) ends at step (1205).

At step (1300): The switch trigger assembly (100) is attached with the housing (200). For example, slide the frame (30) into the mounting groove (203) along the length direction of the housing (200) until the locking part (34) abuts against the end of the mounting strip (202), and perform a sealing treatment between the frame (30) and the inner peripheral wall of the housing (200). In an alternative embodiment, the switch trigger assembly (100) is injection moulded with the housing (200) forming an integral unit.

The method (1000) ends at step (1400).

Therefore, the present invention has the advantage of providing a switch trigger assembly (100) for an electronic device (1). The switch trigger assembly (100) simplifies the overall structure, reducing the need for multiple components and thereby lowering production costs. The streamlined design enhances the sealing and protection of the electronic device (1), preventing contamination and damage during usage and charging. By integrating the pressing member (10) and the charging structure (20) into a single unit, the invention not only provides an aesthetically pleasing appearance but also enhances the user experience by offering reliable and efficient performance in beauty and skincare applications. Further, the assembly of the switch trigger assembly (100) is convenient, which helps to improve the efficiency of assembling the switch trigger assembly (100) on the housing (200).

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to explain the principles of the present invention best and its practical application, to thereby enabling others skilled in the art to best utilise the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the claims of the present invention.

We claim:

1. A switch trigger assembly (100) for an electronic device (1) comprising:
a frame (30);
a pressing member (10) attached to the frame (30) to trigger a switch element (300) arranged on the electronic device (1), the pressing member (10) having a first surface (11) and a second surface (12);
a charging structure (20) integrated into the pressing member (10), the charging structure (20) having a first end exposed from the first surface (11) of the pressing member (10) to receive an electrical charge from an external charging device, and a second end in connection with a circuit board (400) of the electronic device (1) establishing an electrical connection between the external charging device and the circuit board (400) for charging the electronic device (1).

2. The switch trigger assembly (100) as claimed in claim 1, wherein the pressing member (10) is movable between a first position and a second position, in the second position, the pressing member (10) triggers the switch element (300) of the electronic device (1) when pressed by the user.

3. The switch trigger assembly (100) as claimed in claim 1, wherein the frame (30) has an opening (31) adapted to receive the pressing member (10) therein, the pressing member (10) has a limiting groove (14) configured on a side surface of the pressing member (10) to engage with the frame (30), wherein the frame (30) has a limiting part (32) protruding inwards from an edge of the opening (31) to engage with the limiting groove (14) of the pressing member (10), wherein the limiting groove (14) is adapted to limit the movement of the pressing member (10) between a first position and a second position.

4. The switch trigger assembly (100) as claimed in claim 1, wherein the pressing member (10) has a protruding column (16) extending downward from the second surface (12) of the pressing member (10), upon pressing the pressing member (10), the protruding column (16) pushes the switch element (300) to actuate an actuating mechanism (500) of the electronic device (1).

5. The switch trigger assembly (100) as claimed in claim 4, wherein the actuating mechanism (500) includes a light emitting element or a heating element or a vibrating member or a cooling element to respond to the trigger received from the pressing member (10).

6. The switch trigger assembly (100) as claimed in claim 1, wherein the charging structure (20) has a first pin (20a) and a second pin (20b) arranged adjacent to each other, wherein the first end of the first pin (20a) and the second pin (20b) is aligned with a mounting hole (13) provided on the pressing member (10) to connect with the external charging device and the second end is adapted to connect with the circuit board (400) of the electronic device (1).

7. The switch trigger assembly (100) as claimed in claim 1, wherein the charging structure (20) includes at least one spring pin (210), the spring pin (210) consists of the first part (21) and a second part (23) telescopically arranged in or on the first part (21), wherein, upon applying a pressing force (F), the spring pin (210) allows the pressing member (10) to configure a second position by overcoming the spring force of a biasing member (25), and upon removal of the pressing force from the pressing member (10), the pressing member (10) resets back to a first position due to the biasing force of the biasing member (25).

8. The switch trigger assembly (100) as claimed in claim 1, wherein the pressing member (10) is provided with a recessed portion (17) on the second surface (12), the recessed portion (17) is provided to receive and attach a magnetic element (50) therein, the magnetic element (50) facilitates a magnetic attachment with the external charging device ensuring the continuous electrical contact between the external charging device and the charging structure (20).

9. The switch trigger assembly (100) as claimed in claim 1, wherein the switch trigger assembly (100) includes a retraction part (40) attached to the frame (30), the retraction part (40) being adapted to deform when the pressing member (10) is pressed, and to retract upon removal of the applied force, returning the pressing member (10) to a first position.

10. The switch trigger assembly (100) as claimed in claim 9, wherein the retraction part (40) includes a sealing plate (41) and a protrusion (43), the protrusion (43) is located on the edge of the sealing plate (41), wherein the frame (30) is provided with a slot (33) and is adapted to receive the protrusion (43) therein for securely attaching the retraction part (40) with the frame (30).

11. The switch trigger assembly (100) as claimed in claim 9, wherein the retraction part (40) is adapted to receive a protruding column (16) and the charging structure (20), wherein the retraction part (40) has a first through hole (411) to receive the protruding column (16) and a second through hole (412) to receive the charging structure (20).

12. The switch trigger assembly (100) as claimed in claim 1, wherein the frame (30) is provided with two elastic arms (35) located on opposite sides of the opening (31) to support the pressing member (10) on opposite sides, wherein the two elastic arms (35) are adapted to support the pressing member (10) for bearing a part of a pressing force (F) thereon when pressed by the user.

13. The switch trigger assembly (100) as claimed in claim 1, wherein the electronic device (1) includes a housing (200) having an aperture (201) to receive the switch trigger assembly (100) therefrom, wherein the frame (30) has a locking part (34) extending along an edge of the frame (30) to connect the frame (30) with the housing (200) of the electronic device (1), wherein the housing (200) has a mounting strip (202) arranged around the aperture (201) of the housing (200) to receive and hold the frame (30) therein.

14. An electronic device (1), having a housing (200), a circuit board (400), a switch element (300), and an actuating mechanism (500) electrically connected to the circuit board (400), the electronic device (1) comprising:
  a switch trigger assembly (100) arranged in the housing (200) and electrically connected to the circuit board (400), wherein the switch trigger assembly (100) includes:
  a frame (30);
  a pressing member (10) attached to the frame (30) to trigger the switch element (300) arranged on the circuit board (400) thereby actuating the actuating mechanism (500), the pressing member (10) having a first surface (11) and a second surface (12); and
  a charging structure (20) integrated into the pressing member (10), the charging structure (20) having a first end exposed from the first surface (11) of the pressing member (10) to receive an electrical charge from an external charging device, and a second end is-in connection with the circuit board (400) establishing an electrical connection between the external charging device and the circuit board (400) for charging the electronic device (1).

15. The electronic device (1) as claimed in claim 14, wherein the housing (200) is adapted to house the circuit board (400), wherein the circuit board (400) is exposed through an aperture (201) arranged on the housing (200), wherein the aperture (201) is adapted to receive the switch trigger assembly (100) therefrom.

16. The electronic device (1) as claimed in claim 14, wherein the electronic device (1) includes an applicator (700), arranged at an end of an outlet section (205) away from an assembly section (204), the applicator (700) is used to apply the liquid output on the skin of the user.

17. The electronic device (1) as claimed in claim 16, wherein the applicator (700) is a roller ball, which is rollingly arranged at the end of the outlet section (205), the roller ball (700) is adapted to apply the liquid to the skin while rolling over the skin.

18. A method (1000) to assemble a switch trigger assembly (100) to an electronic device (1), the method (1000) comprising steps of:
  obtaining the switch trigger assembly (100) by assembling a pressing member (10), charging structure (20), a frame (30), and a retraction part (40);
  attaching the switch trigger assembly (100) to a housing (200) of the electronic device (1) facilitating the switching and charging of the electronic device (1) thereafter,
  wherein obtaining the switch trigger assembly (100) includes the steps of:
    attaching the charging structure (20) with the pressing member (10) to obtain a first half assembly,
    attaching the retraction part (40) with the frame (30) to obtain a second half assembly, joining the first half assembly and the second half assembly to obtain the switch trigger assembly (100).

19. The method (1000) as claimed in claim 18, wherein the switch trigger assembly (100) includes a magnetic element (50) attached to the pressing member (10) for obtaining the first half assembly or the second half assembly.

\* \* \* \* \*